No. 656,846. Patented Aug. 28, 1900.
F. LEHMANN & A. VAN KEMPEN.
MACHINE FOR MEASURING AND MARKING CLOTH.
(Application filed Jan. 24, 1899.)
(No Model.) 4 Sheets—Sheet 1.

WITNESSES:
Ella L. Giler

INVENTORS.
Franz Lehmann
Anton van Kempen
BY Richardson
ATTORNEYS

No. 656,846. Patented Aug. 28, 1900.
F. LEHMANN & A. VAN KEMPEN.
MACHINE FOR MEASURING AND MARKING CLOTH.
(Application filed Jan. 24, 1899.)

(No Model.) 4 Sheets—Sheet 3.

WITNESSES:
INVENTORS.
Franz Lehmann
Anton van Kempen
BY
ATTORNEYS

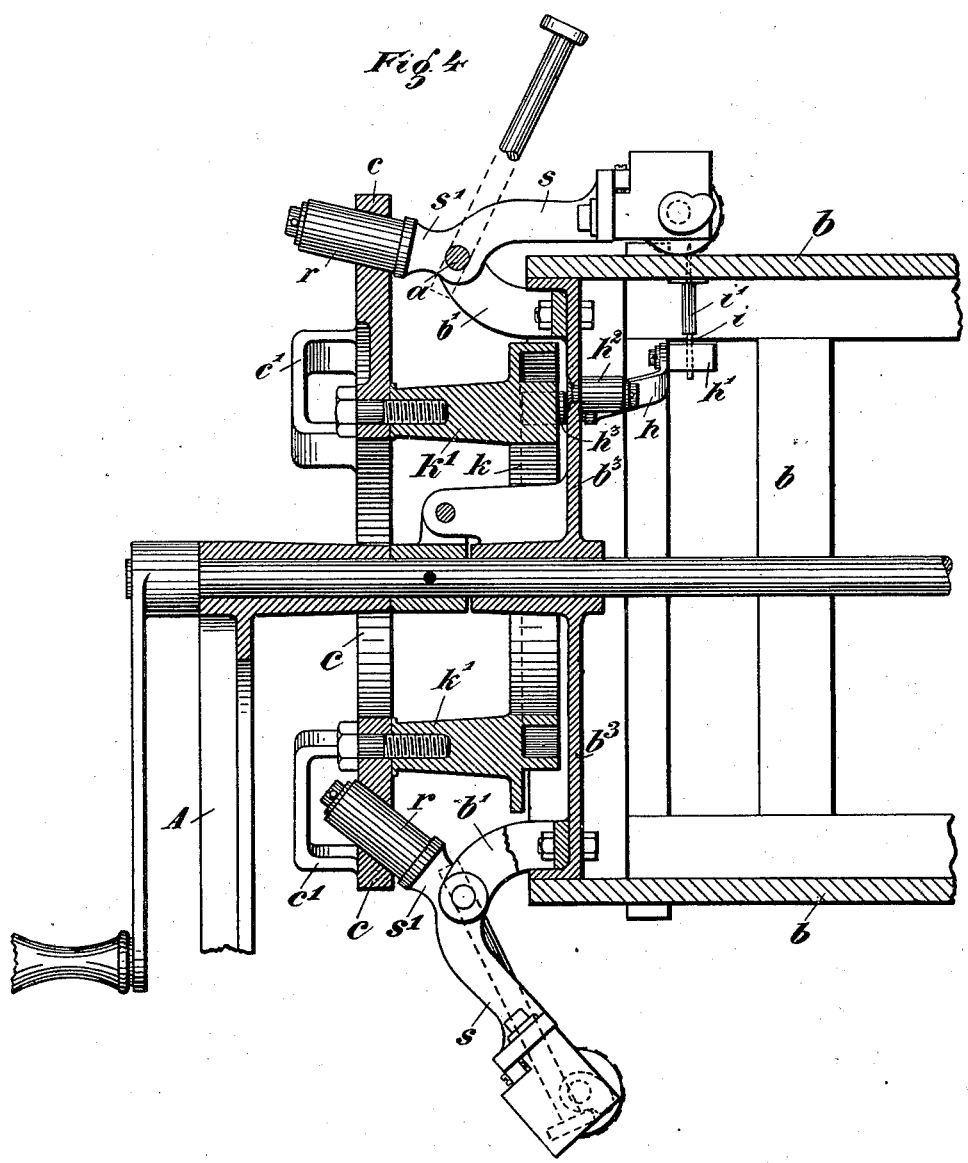

UNITED STATES PATENT OFFICE.

FRANZ LEHMANN AND ANTON VAN KEMPEN, OF BERLIN, GERMANY.

MACHINE FOR MEASURING AND MARKING CLOTH.

SPECIFICATION forming part of Letters Patent No. 656,846, dated August 28, 1900.

Application filed January 24, 1899. Serial No. 703,287. (No model.)

*To all whom it may concern:*

Be it known that we, FRANZ LEHMANN and ANTON VAN KEMPEN, subjects of the Emperor of Germany, and residents of Berlin, Germany, have invented certain new and useful Improvements in Machines for Measuring and Indicating or Stamping Cloth, of which the following is a specification.

This invention relates to a machine for measuring cloth and the like or other fabrics and for indicating or stamping upon the fabric units of length.

The improved machine is especially applicable for use with velvet, muslin, crape, gauze, or other delicate and easily-stretchable textile fabrics which would be damaged by being passed through one or more sets of rollers. Another advantage attained by the use of our improvements is that the machine may be easily adjusted, so that different units of length may be stamped, according to the country for which the goods are intended.

The measuring-drum is square or polygonal in cross-section and is provided at its corners or angles with pins or equivalent devices, which at the proper moment are caused to project and engage with the fabric to be measured in such a manner as to move it onward and hold it in a suspended position until it finally comes to rest upon one side of the drum. Upon the further rotation of the drum the pins are automatically withdrawn and the fabric is disengaged.

In order to enable the machine to vary the length measured during each revolution of the drum, the latter is provided with two of its opposite sides movable away from the center, so that one of the diameters or the total circumference is altered.

The stamping device is fixed upon one end of the drum with which it rotates and is operated by a fixed cam or grooved disk or plate. This simplifies the mechanism considerably and makes the machine quicker and more exact, as it is not necessary to stop it in order to enable the stamping to be effected.

The improved machine is illustrated by the accompanying drawings, which will be referred to hereinafter.

Figure 1:
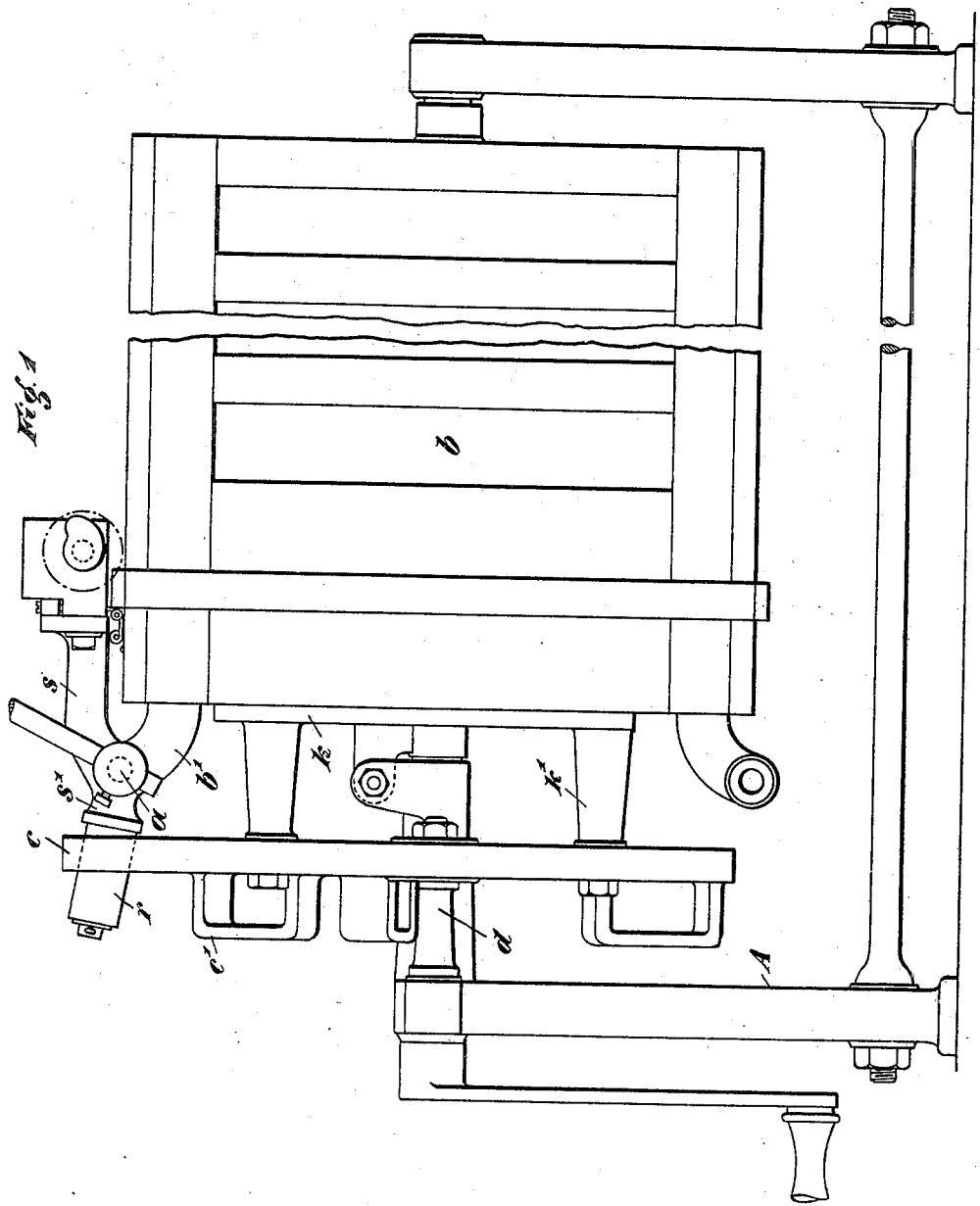
Figure 2:
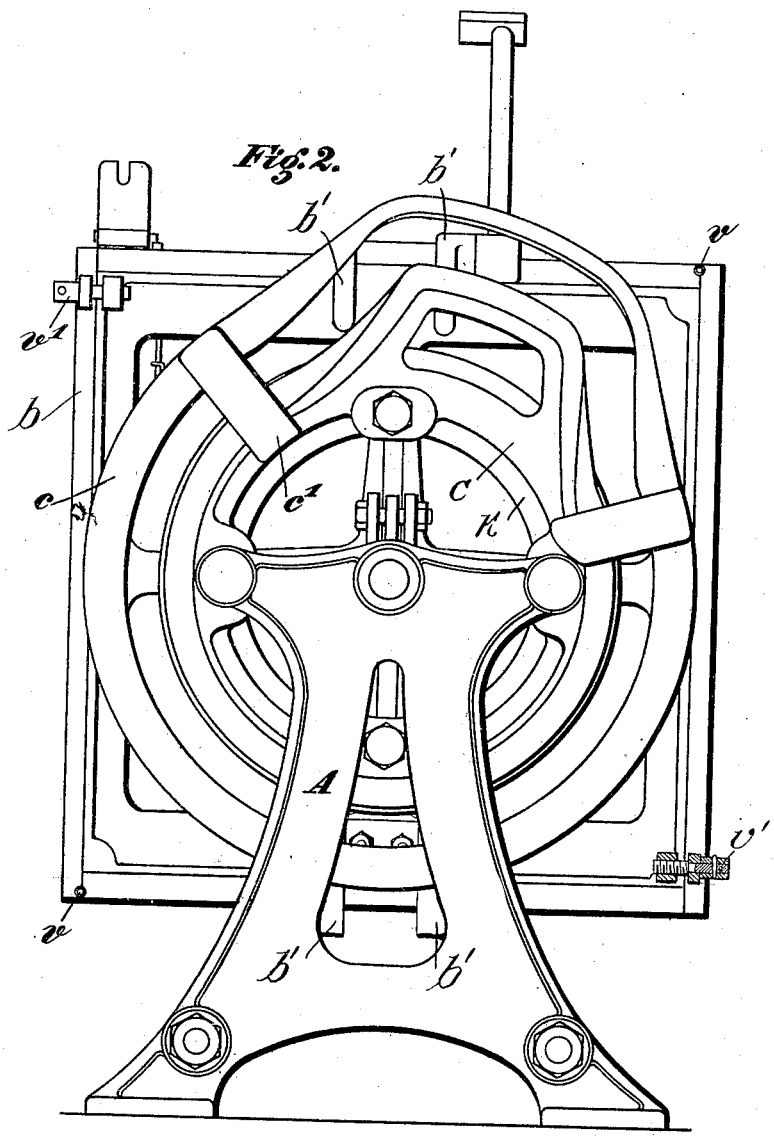
Figure 3:
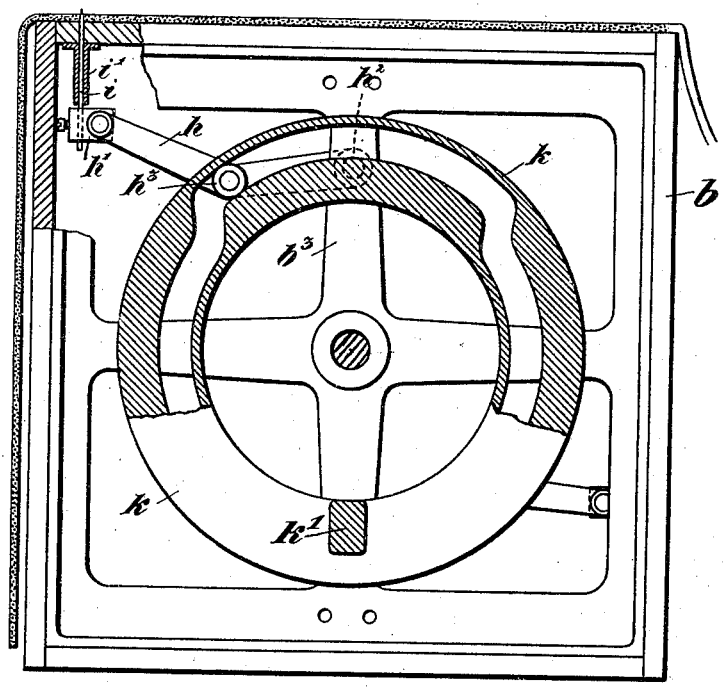

Figure 1 shows the machine in elevation from the front, part being broken away. Fig. 2 represents it in end elevation. Fig. 3 illustrates the mechanism for actuating the pins by means of which the cloth is engaged, this figure being a view on line 3 3 of Fig. 4, with parts omitted and parts broken away. Fig. 4 is a sectional view of one end of the drum and attached devices, the section being taken along the shaft of the drum.

The measuring-drum $b$ is illustrated as square; but it will be understood that it may be of any other polygonal section. It is carried by suitable end bearings. The stamping device is carried by the drum at one end by means of the bracket $b'$. Only one such device is shown in the machine illustrated; but it will be understood that more may be provided—for example, there may be one for each side or flat face of the roller, according to the units of length desired to be impressed or marked. Each stamping device consists of a two-armed lever $s\ s'$, pivoted at $a$. The arm $s$ carries the type or figures, which are automatically and progressively moved by well-known mechanism or devices. The other arm $s'$ is furnished with a friction roller or bowl $r$, which enters within and engages with a groove formed in a disk $c$, the two parts of which are joined and held together by the bridge-pieces $c'$. This disk $c$ is fixed to the frame A of the machine by means of the bolts $d$. The groove is of such a shape as to cause the stamping device to be brought into contact with the cloth once during each revolution of the drum, as shown in Fig. 1, preferably when the side upon which the marking is to take place is in its highest horizontal position. As the fabric remains upon the drum until the previously-horizontal side of the drum has reached a vertical position the marks printed upon the fabric will not be obliterated, so that a continuous rotation may be kept up and so that the movement of the stamping device need not be hurried.

In Fig. 2 the friction-roller $r$ is not shown in order that the shape of the groove in the disk $c$ may be more clearly seen.

Referring to Figs. 3 and 4, one set of pins or equivalent devices is shown, together with the actuating mechanism. The pins $i$ are secured in sockets $h'$ and are capable of being moved within small guide-tubes $i'$, fastened to the inside of the drum. Each socket is movably connected to one end of a lever or arm $h$, the other end of which is pivoted at $h^2$ to the frame $b^3$ of the drum. Secured to the lever $h$ is a small friction-roller $h^3$, which engages with a groove formed in the ring or plate $k$. This ring is secured to the disk $c$ by means of the bolts $k'$ or is otherwise held in a rigid position. It will be seen that its groove for the greater part is concentric with the axis of the drum, but that at a certain point the pins will be lifted to project through the surface of the drum. At a certain other point the pins will be withdrawn and the stamped fabric will be free to fall off the drum. The pin is shown projected in Fig. 4, and it is thus in position for engaging the cloth. This action takes place in proximity to the stamp, and the pin holds the cloth in position on the drum until after the printing or stamping has been accomplished.

Instead of having the internal pins described and illustrated the drum may be furnished with equivalent external devices for engaging with the cloth. For instance, arms may be pivoted at each end of the drum, with pins or projections formed or arranged upon them, and may be lowered into contact with the fabric at the desired moment by means of a suitable cam-plate or grooved disk.

In order to vary the amount of fabric measured at each revolution of the drum, two of its opposite sides are hinged to the framework at opposite ends, as at $v$ $v$. The other end of each of these movable sides is provided with a screw or other device $v'$, by means of which it may be moved away from or toward the next side of the drum. The circumference of the drum may thus be varied. This arrangement is of great value when easily-stretchable fabrics are being treated, as the movable sides may be so adjusted as to compensate for the amount of stretch. In measuring non-stretching materials the circumference of the drum will need to be carefully adjusted to the exact length required to be indicated.

By the arrangement of the stamping device upon the drum $b$ the advantage is attained that the cloth in being stamped is not moved alone, but always at the same time with the stamp, so that the stamp may rest for several seconds on the cloth without wiping away or blurring the printed numbers.

The purpose of the adjustable walls of the drum will be clear from the following example: Let us say the periphery of the drum is exactly two meters and two stamps are used, as in Fig. 4. At a rotation a distance of two walls the stamping device always stamps one number, whereby the cloth is transported one meter. We will suppose that the cloth has stretched itself ten centimeters and shrinks up again ten centimeters in leaving the drum $b$. The stamped numbers will be kept at a distance of only one meter minus ten centimeters, which equals ninety centimeters. To avoid this difference, it is necessary to move the movable walls so far to the outside that the surface of two walls has one meter plus ten centimeters, which equals 1.10 meters. When the cloth shrinks up after having left the drum, the numbers are kept at a distance of exactly one meter, as intended. The difference due to the stretching will be varied according to the character of the cloth, and this difference may always be avoided by various adjustments of the walls.

Having now particularly described and ascertained the nature of our said invention and in what manner the same is to be performed, we declare that what we claim is—

1. In combination in a measuring-roller for cloth and a marking or stamping device moving in unison with the roller with means for operating the stamping device at certain points in the revolution of the roller, said stamping device overhanging the outside of the roller and movable toward and from the outer surface thereof, substantially as described.

2. In combination, a polygonal roller, and a stamping device revolving around the roller-axis in unison therewith and means for moving the marking device toward and from the same point on the roller, said stamping device being supported from the end of the roller and overhanging the outer face of the same, substantially as described.

3. In combination, the roller, a stamping device revolving therewith and moving toward and from the roller and a pin or pins carried by the roller with means for projecting it through the cloth, said stamping device being arranged outside of the roller and operating in printing inwardly while the pins act in the opposite direction, substantially as described.

4. In combination, the roller, the stamping device moving about the axis in unison with the roller and a pin with means for projecting it through the cloth adjacent to the stamping device, said stamping device being arranged outside of the roller and operating in printing inwardly while the pins act in the opposite direction, substantially as described.

In witness whereof we have hereunto signed our names, this 4th day of January, 1899, in the presence of two subscribing witnesses.

FRANZ LEHMANN.
ANTON VAN KEMPEN.

Witnesses:
 HENRY HASPER,
 WOLDEMAR HAUPT.